US011907842B2

(12) United States Patent
Gliozzo et al.

(10) Patent No.: US 11,907,842 B2
(45) Date of Patent: Feb. 20, 2024

(54) DEEP SYMBOLIC VALIDATION OF INFORMATION EXTRACTION SYSTEMS

(71) Applicant: International Business Machines Corporation, Armonk, NY (US)

(72) Inventors: Alfio Massimiliano Gliozzo, Brooklyn, NY (US); Sarthak Dash, Jersey City, NJ (US); Michael Robert Glass, Bayonne, NJ (US); Mustafa Canim, Ossining, NY (US)

(73) Assignee: NTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/154,149

(22) Filed: Jan. 13, 2023

(65) Prior Publication Data

US 2023/0177335 A1 Jun. 8, 2023

Related U.S. Application Data

(63) Continuation of application No. 16/241,569, filed on Jan. 7, 2019, now Pat. No. 11,574,179.

(51) Int. Cl.
*G06F 21/55* (2013.01)
*G06N 3/08* (2023.01)

(52) U.S. Cl.
CPC ............ *G06N 3/08* (2013.01); *G06F 21/554* (2013.01); *G06F 2221/034* (2013.01)

(58) Field of Classification Search
CPC .................. G06F 21/554; G06F 2221/034
USPC ............................................. 706/25
See application file for complete search history.

(56) References Cited

U.S. PATENT DOCUMENTS

| 2006/0224566 | A1* | 10/2006 | Flowers .............. G06F 16/3329 |
| 2011/0270604 | A1 | 11/2011 | Qi et al. |
| 2016/0378851 | A1 | 12/2016 | Merdivan et al. |
| 2017/0213136 | A1* | 7/2017 | Barker ..................... G06N 5/04 |

FOREIGN PATENT DOCUMENTS

| CN | 107526799 A | 12/2017 |
| CN | 107729497 A | 2/2018 |
| CN | 107798136 A | 3/2018 |

OTHER PUBLICATIONS

Nguyen, et al., "A Novel Embedding Model for Knowledge Base Completion Based on Convolutional Neural Network," arXiv:1712.02121v2 [cs.CL] Mar. 13, 2018, 7 pages.

(Continued)

*Primary Examiner* — Anthony D Brown
(74) *Attorney, Agent, or Firm* — Amin, Turocy & Watson, LLP

(57) ABSTRACT

A system comprises a memory that stores computer-executable components; and a processor, operably coupled to the memory, that executes the computer-executable components. The system includes a receiving component that receives a corpus of data; a relation extraction component that generates noisy knowledge graphs from the corpus; and a training component that acquires global representations of entities and relation by training from output of the relation extraction component.

20 Claims, 8 Drawing Sheets

(56) References Cited

OTHER PUBLICATIONS

Lv, et al., "Clinical Relation Extraction with Deep Learning," International Journal of Hybrid Information Technology vol. 9, No. 7 (2016), pp. 237-248, http://dx.doi.org/10.14257/ijhit.2016.9.7.22.
Dettmers, "Convolutional 2D Knowledge Graph Embeddings," arXiv:1707.01476v2 [cs.LG] Jul. 8, 2017, 15 pages.
Anonymous, "Natural Language Video Processing (Machine Learning-based Identification, Search, Extraction)," IP.com Electronic Publication Date: Dec. 14, 2017, 10 pages.
Anonymous, "Identifying and Determining Trustworthiness of a Machine-Learned Model," IP.com Electronic Publication Date: Jan. 5, 2018, 35 pages.
Cai, et al., "KBGAN: Adversarial Learning for Knowledge Graph Embeddings," Proceedings of NAACL-HLT 2018, pp. 1470-1480 New Orleans, Louisiana, Jun. 1-6, 2018, Copyright: 2018.
Pujara, et al., "Ontology-Aware Partitioning for Knowledge Graph Identification," AKBC'13, Oct. 27-28, 2013, San Francisco, CA, USA, 5 pages.
Jiang, et al., "Learning to Refine an Automatically Extracted Knowledge Base using Markov Logic," 2012 IEEE 12th International Conference on Data Mining, 6 pages.
Nguyen, "Deep Learning for Information Extraction," A dissertation submitted in partial fulfillment of the requirements for the degree of Doctor of Philosophy, Department of Computer Science, New York University, May 2017, 246 pages.
Gliozzo, et al., "Deep Symbolic Validation of Relation Extraction Systems," Last Accessed: Aug. 24, 2018, 8 pages.
Shi, et al., "ProjE: Embedding Projection for Knowledge Graph Completion," Copyright 2017, Association for the Advancement of Artificial Intelligence (www.aaai.org), 7 pages.
Gliozzo, et al., "The Domain Restriction Hypothesis: Relating Term Similarity and Semantic Consistency," Last Accessed: Aug. 24, 2018, 8 pages.
Non-Final Office Action received for U.S. Appl. No. 16/241,569 dated May 25, 2022, 19 pages.
List of IBM Patents or Applications Treated as Related.

* cited by examiner

US 11,907,842 B2

DEEP SYMBOLIC VALIDATION OF INFORMATION EXTRACTION SYSTEMS

TECHNICAL FIELD

The subject disclosure relates generally to a method identified as "Deep Symbolic Validation (DSV)" as a new deep learning-based solution to improve the quality of knowledge graphs (KG) derived from the output of information extraction.

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that facilitate a neural network solution to acquire knowledge from the symbolic output of perception systems and apply it to validate new relations, resulting in improved accuracy across certain relation extraction benchmarks.

In accordance with an embodiment, a system, comprises: a memory that stores computer-executable components; a processor, operably coupled to the memory, that executes the computer-executable components, wherein the computer-executable components comprise: a receiving component that receives a corpus of data; a relation extraction component that generates noisy knowledge graphs from the corpus; and a training component that acquires global representations of entities and relation by training from output of the relation extraction component.

In accordance with an embodiment a computer-implemented method, comprises: receiving, by a processor operative coupled to a memory, a corpus of data; Generating via relation extraction, by the processor, noisy knowledge graphs from the corpus of data; and acquiring, by a processor, global representations of entities and relation by training from output of the relation extraction.

DETAILED DESCRIPTION

Figure 1A:
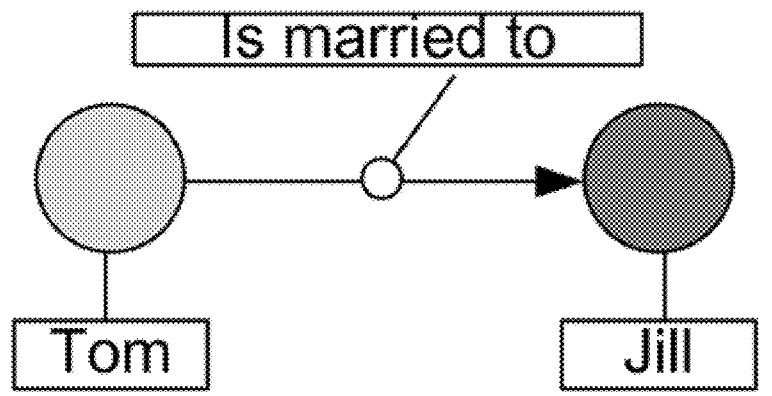
FIG. 1A illustrates an example of a triplet in accordance with one or more embodiments described herein.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

In recent years, AI (artificial intelligence) and neural networks have demonstrated significant business impact in large scale data analysis and classification tasks such as speech recognition, visual object detection, pattern extraction, etc. When businesses consider the benefits of data analysis, what's often overlooked is the challenge of data variety, and that most successful outcomes are driven by it. Yet businesses are still struggling with how to query distributed, heterogenous data using a unified data model.

Data based charts identified as Knowledge Graphs provide a schema flexible solution based on modular, extensible data models that evolve over time to create a truly unified solution. A knowledge graph is organized as a graph, which is not always true of knowledge bases. The primary benefits of a graph are that relationships in the data can connect new data items as they are injected into the data pool, and, finally, traverse links to discover how remote parts of a domain relate to each other (there's a huge value in linking information). A graph is one of the most flexible formal data structures, so you can easily map other data formats to graphs using generic tools and pipelines.

The meaning of the data is encoded alongside the data in the graph, in the form of the ontology. A knowledge graph is self-descriptive single place to find the data and understand what it's all about.

An additional benefit in that it is possible to submit queries in a style that is much closer to a natural language, using a familiar domain vocabulary. That is, the meaning of the data is typically expressed in terms of entity and relation names that are familiar to those interested in the given domain. This enables smarter search, more efficient discovery, and narrows the communication gap between data providers and consumers.

An underlying basis of a knowledge graph is ontology, which specifies semantics of data. An ontology is typically based on logical formalisms which support some form of inference: allowing implicit information to be derived from explicitly asserted data. Some of the information inferred can be otherwise hard to discover.

Knowledge graphs are actual graphs, in a proper mathematical sense, allow for application of various graph-computing techniques and algorithms (e.g., shortest path computations, or network analysis), which add additional intelligence over stored data. These graphs have a flexible structure: the ontology can be extended and revised as new data arrives. This makes it convenient to store and manage data in a knowledge graph if there are cases where regular updates and data growth are important, particularly when data is arriving from diverse, heterogenous sources. A knowledge graph can support a continuously running data pipeline that keeps adding new knowledge to the graph, refining it as new information arrives, so essentially it may even be considered real time.

Knowledge graphs are also able to capture diverse metadata annotations such as provenance or versioning information, which make them productive for working with a dynamic dataset. There is an increasing need to account for the provenance of data and include it so that the knowledge can be assessed by its consumers in terms of credibility and trustworthiness. It is possible that a knowledge graph can answer what it knows, and also how and why it knows it.

In reference to the aforementioned potential benefit, it is possible to submit queries for targets in a style that is much closer to a natural language using a familiar domain vocabulary. For example, if a target relation is president of, anybody will be able to detect an occurrence of this relation between the entities TRUMP and UNITED STATES in the sentence "Trump lives in the White House". This is because humans have a great deal of background knowledge about the world and are able to use it to perform logical inference over partial evidence observed in text. In the previous example, background knowledge about the WHITE HOUSE suggests that its most popular tenant is the PRESIDENT OF THE UNITED STATES. Background knowledge can also be used to validate wrongly recognized assertions in text. For example, an automatic system might wrongly recognize the relation president of (Putin, United Stated) from the sentence "Putin is a close friend of the President of the United States". However, this relation might be contradicting another statement such us birthplace (Putin, Russia). Humans are able to reconcile inconsistencies like these at an almost subconscious level, resulting in improved perceptions capabilities. Unfortunately, this is not the case for most AI systems.

Figure 1B:
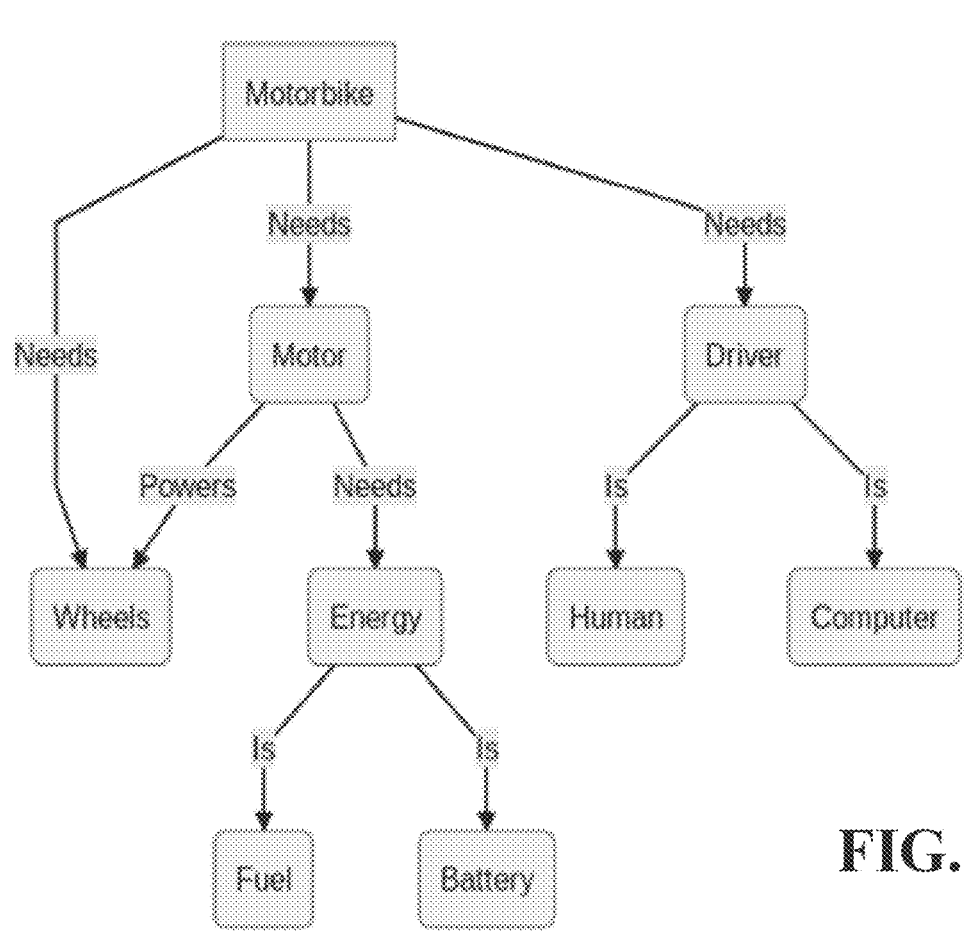
FIG. 1B illustrates an example of a knowledge-based graph with triplets in accordance with one or more embodiments described herein.

An elementary unit of a knowledge graph is a triplet subject-predicate-object, often denoted as (head, relation, tail) or (h, r, t). A semantic triple, or simply triple, is the atomic data entity in the Resource Description Framework (RDF) data model in which a triple is a set of three entities that codifies a statement about semantic data in the form of subject—predicate— object expressions. Each triplet defines one connection between two entities in the graph. The set of acceptable relationships and entity types defines ontology of the KG, which is also its general structure. For example, it may be a graph of geographical objects, biomedical structures, web pages, etc. From a collection of entries, KG allows us to perform inferences. The inference connections between the entities "Tom", "is married to" and "Jill" FIG. 1A illustrates an example of a triplet 101. In this case, Tom is the "head", is married to is the "relation" and Jill is the "tail". Many knowledge repositories nowadays contain billions of triplets, as relation instance and these triplets can form a directed graph with entities as nodes and relationships as edges. An example of a knowledge-based graph 103 with triplets is depicted in FIG. 1B.

As future technology embraces AI, knowledge graphs can be utilized in many potential applications including but not limited to: semantic search, automated fraud detection, intelligent chatbots, advanced drug discovery, dynamic risk analysis, content-based recommendation engines, cybersecurity and knowledge management systems. To capture this type of significant data for each of these industries, information extraction systems can create area specific knowledge graphs which can then be potentially utilized to enhance pertinent information for business purposes. Information extraction systems can automatically construct knowledge graphs from a large collection of documents, which might be drawn from news articles, Web pages, social media posts or discussion forums. The language understanding task can be challenging, and current extraction systems can introduce many kinds of errors leading to poor quality of the knowledge graph. This is the problem the embodiments can solve utilizing the method within.

Embodiments provide a deep learning-based alternative to probabilistic reasoning for a problem of validating output of relation extraction systems, basically a method that can improve quality of knowledge graphs derived from output of information extraction. Various embodiments are referred to as Deep Symbolic Validation (DSV), which acquires global representations of entities and relation from analysis of large and noisy knowledge graphs extracted by applying relation extraction from large corpora. Then it applies them to validate the same input it has been trained from, with a goal of improving accuracy of input relations.

DSV is deep learning based and does not require training data or ad-hoc logical constraints for a domain. Embodiments exploit noisy output of relation extraction systems for training and adopt a loss function able to take into account uncertainty in training data. There is a profound difference between perception and validation. Perception is done locally by observing a specific piece of information (e.g. a sentence or a set of sentences) with a goal of attributing symbols to an otherwise continuous signal. A result of perception is a set of noisy relations between symbols (e.g., entities in a relation extraction use case). On the other hand, validation is done at a symbolic level and analyzes results provided by a perception step from a global perspective, to discover inconsistencies, anomalies and outliers. DSV was tested on three different relation extraction tasks, using different input relation extraction systems, and data observed empirically improved in performance.

Figure 1C:
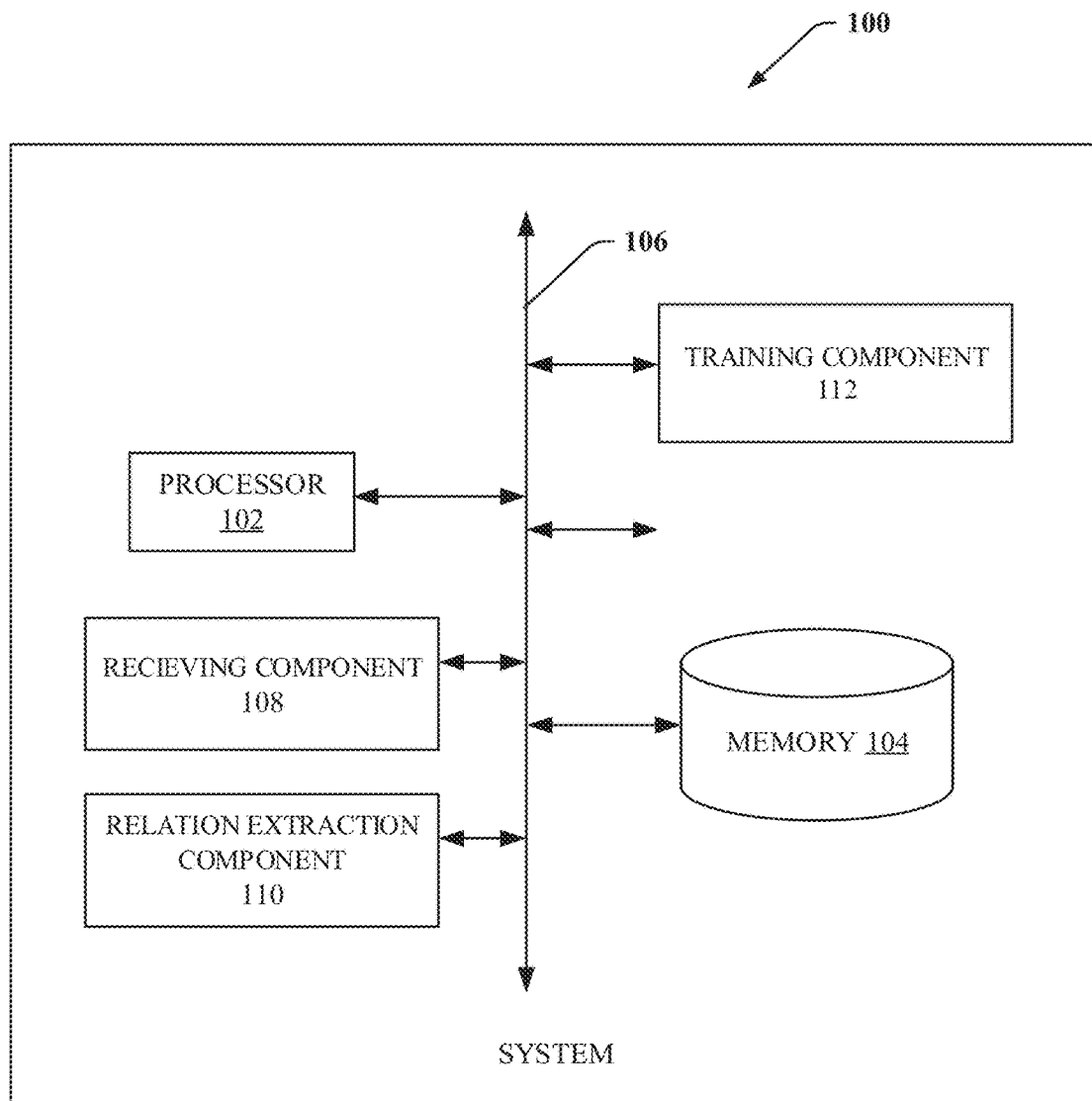
FIG. 1C illustrates a block diagram of an example system that provides knowledge-based training in accordance with one or more embodiments described herein.

FIG. 1 illustrates a block diagram of an example system 100 that can access and process data using variable computing components depicted in accordance with one or more embodiments described herein. The system 100 can facilitate a process of assessing and identifying a large amount of various forms of data, and using machine learning, train a neural network or other type of model. The system 100 can generate predictive recommendations to an individual level resulting in a context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, a receiving component 108 that receives a large corpus of data (corpus referred to primarily as a collection of texts, especially if complete and self-contained or a body of texts, other specimens considered more or less representative of a language, and usually stored as an electronic database. Currently, computer corpora may store many millions of running words, whose features can be analyzed by various means. The embodiments provide a method to improve upon analysis of large corpora. Relation extraction component 110 generates noisy knowledge graphs in the form of quads (derived from the corpus data). A quad has the form q=<e1, r,e2,s> where $ei \in V$ are entities found in the corpus, $r \in R$ is a finite set of relations and $s \in [0,1]$. For at least some general experiments described herein, distantly supervised relation extraction systems were utilized. In the distantly supervised settings, a knowledgebase K consisting of quads q=<e1,r,e2,1>$\in$ K is provided as an input and RelEx (Relation Extraction) is trained from their contexts φ(e1,e2) in a large corpus. Training component 112 acquires global representations of entities and relation by training from output of the relation extraction component.

System 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, memory 104 can store computer executable components executable by processor 102. Receiving component 108 has a preliminary task of performing the two-step process that the embodiments utilize which are perception and validation. The training component block 112 is dependent upon noisy output of relation extraction, which is a novel within the embodiments.

Various components of system 100 can be connected either directly or via one or more networks. Such networks can include wired and/or wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

The subject computer processing systems, methods apparatuses and/or computer program products can be employed to solve new problems that arise through advancements in technology, computer networks, the Internet and the like.

Figure 2:
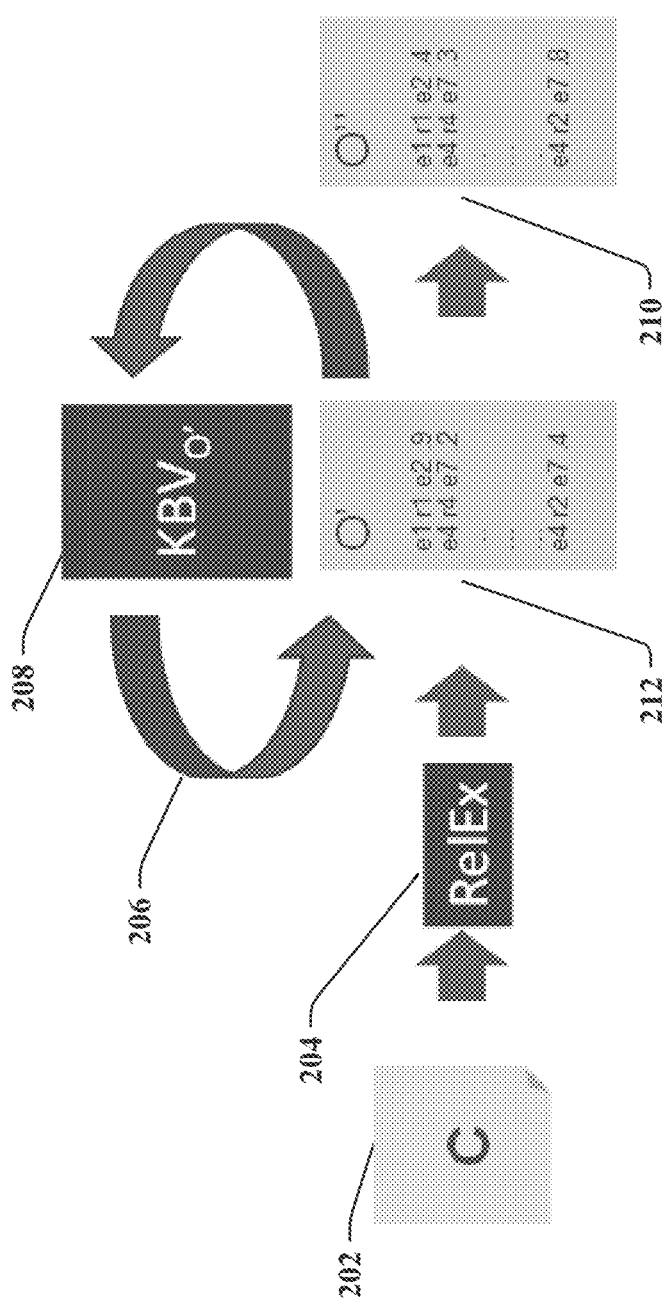
FIG. 2 illustrates embodiments training from an output of relation extraction and applying it to the output itself in accordance with one or more embodiments described herein.

FIG. 2 illustrates embodiments training from an output of relation extraction and applying it to the output itself in accordance with one or more embodiments described herein. The DSV is much more scalable then standard methods currently employed and a major advantage of the DSV approach is adapting techniques from knowledge base completion that don't require any additional supervision. The training also scales linearly with the amount of extraction. From the diagram block 202 is identified as a corpus component C (corpora data) that is subjected to a relation extraction (RelEx) component 204. That application to corpus component C produces Quads (entity relationships+ confidence), which is the output of the relation extraction. Relation extraction is a problem of generating a set of quads as in block 212 O'=q1, q2, . . . , q'n from an corpus of text C=c1, c2, . . . , cm. Quads have the form q=<e1, r, e2, s> where $ei \in V$ are entities found in the corpus, $r \in R$ is a finite set of relations and $s \in [0,1]$. For each entity $e \in V$, the function φ(e) return all possible contexts where the entity "e" appear in the corpus and φ(e1,e2) returns all contexts containing both. This method is used as training data for KBV (206 and 208) system, which is used for a knowledge base validation task. The technique uses an adapted version for Knowledge Base Completion technology (KBC) called ProjE. Most state-of-the-art KBC approaches are usually deep learning based and are trained using triples in the input KG as positive examples and generating negative examples by random corruption of the training data. Embodiments utilize ProjE that learns embeddings for these entities and relations such that the embeddings can reconstruct the output. Subsequently, embodiments use the trained embeddings to re-estimate confidence for the triples, which is a refined output O" (O double prime) 210.

Figure 3:
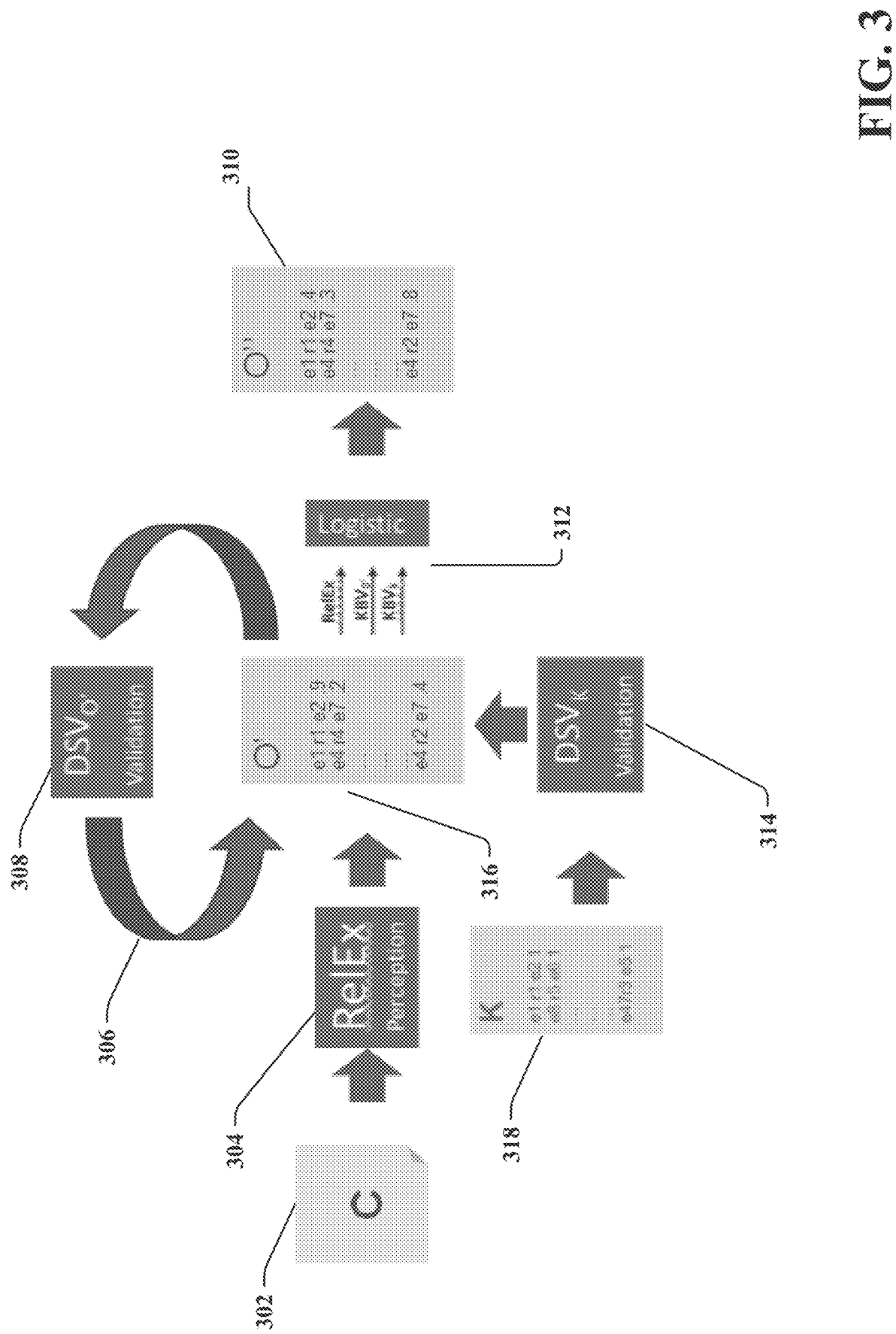
FIG. 3 illustrates embodiments of DSV relation extraction process as two acts: perception and validation in accordance with one or more embodiments described herein.

FIG. 3 illustrates a DSV relation extraction process as two acts: perception and validation in accordance with one or more embodiments described herein. It is significant to note that perception is done locally by observing a specific piece of information (e.g., a sentence or a set of sentences) with a goal of attributing symbols to an otherwise continuous signal. The result of perception is a set of noisy relations between symbols (e.g., entities in the relation extraction use case). Initially block 302 is identified as corpus component C (corpora data) that is subjected to a relation extraction (RelEx) component 304. A perception step is implemented by function 304 RelEx(e1,e2,φ(e1,e2)) such that, for each relation $r \in R$, returns a set of quads assessing their confidence from the analysis of textual evidence, (e.g., RelEx(e1,e2,φ(e1,e2))=<e1,ri,e2,si>|ri $\in$ R, where si is a confidence score for relation ri). RelEx is applied to any pair of entities in V and KB generated after this step is block 316 referred to as O'. For a next step, it is significant to note that validation is done at a symbolic level and consists of analyzing results provided by the perception step from a global perspective, to discover inconsistencies, anomalies and outliers. Validation step(s) (306, 308 and 314) is described formally as a function DSV (<e1,r,e2>) that returns a confidence score for any possible triple such that e1,e2 $\in$ V and $r \in R$. The three confidence scores generated (312) by applying RelEx, KBV'O and KBVK to every triple in O' are then aggregated using a logistic regression layer trained on a validation set to provide a final confidence score, generating the final output (310) 0". The implementation of the validation step using a deep net is driven by a state of the art KBC approach where the loss function was modified to take into account the fuzzy truth values provided by the output of the perception step. After training is done, this net can validate an input triple <e1,r,e2> and return a confidence score. Functionally, this net provides a function DSVT(<e1,r,e2>) returning a confidence score informed by the analysis of the knowledge graph T it has been trained from.

Figure 4:
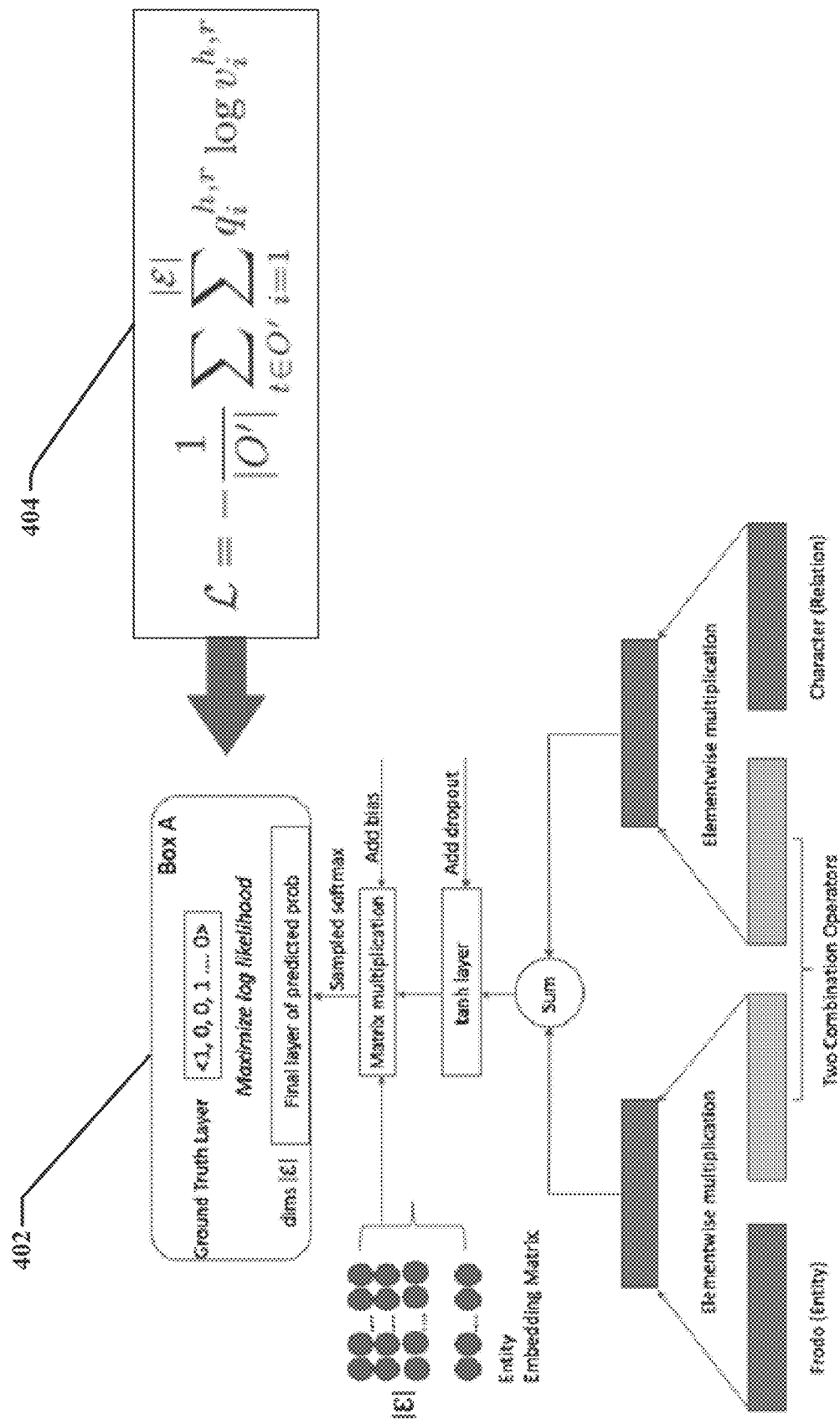
FIG. 4 illustrates a novel loss function and its ability to account for confidence associated to triples in accordance with one or more embodiments described herein.

FIG. 4 illustrates a loss function, novel to KBC, and its ability to account for confidence associated to triples, in accordance with one or more embodiments described herein. To implement the validation step and train DSV on the output of perception the embodiments need to consider confidence scores associated to each triple in the training data, as they have been derived from information extraction systems. To implement this, the embodiments modified the loss function described in 402 to use confidence scores, rather than labels, following an approach proposed for Computer Vision in Gong et al. [2013]. The embodiments assume that the inputs are e1 and r, and the system needs to predict appropriate e2. The variables ve1, r (of dimensions E—number of entities in vocabulary) represent the final layer of predicted probabilities corresponding to input entity e1 and input relation r. Define a vector qe1,r of dimensions |E| that uses the input confidence scores as follows, $$q_i^{h,r} = \begin{cases} s, & \text{if } \langle h, r, \varepsilon_i, s \rangle \in O' \\ 0, & \text{otherwise} \end{cases}$$

where s represents the confidence score for the relation (e1,r,Ei) ∈ O0. The modified loss function now turns out to be (where t is a quad in the set O'), $$\mathcal{L} = -\frac{1}{|O'|} \sum_{i \in O'} \sum_{i=1}^{|\varepsilon|} q_i^{e_1,r} \log v_i^{e_1,r}$$

In the new modified loss function 404, the q vector is now a vector of confidence scores (rather than a one-hot encoding). After the network is trained, it can be used for validation (i.e. assessing the validity of a new triple composed by known entities and relations).

Figure 5:
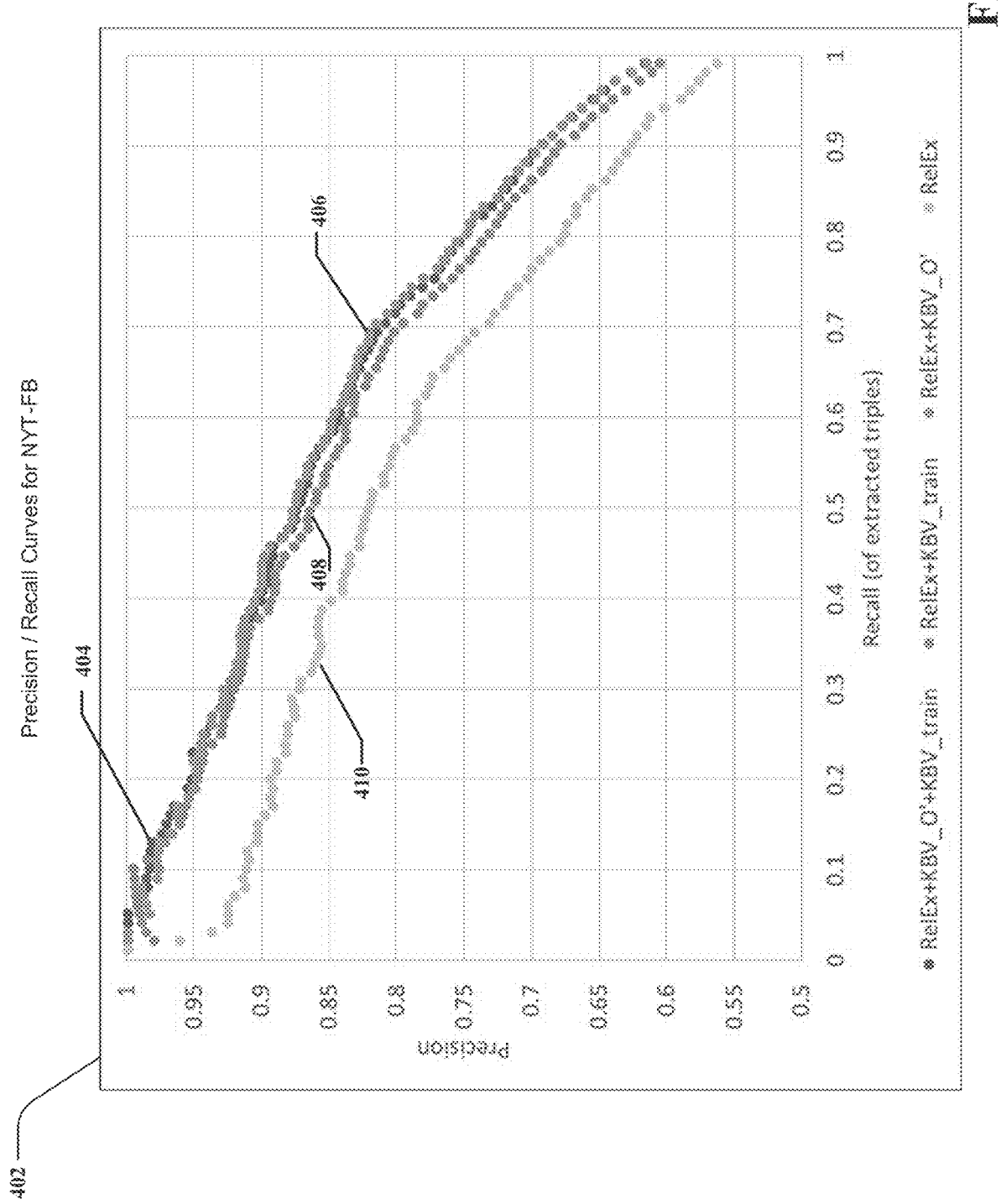
FIG. 5 illustrates evaluation results comparing data of various methods of recall of extracted triples in accordance with one or more embodiments described herein.

FIG. 5 illustrates evaluation results (comparing the embodiments data) with different methods of recall of extracted triples in accordance with one or more embodiments described herein. Block 402 is the graphical results of the benchmark "Precision/Recall Curves for NYT-FB" in which the blue represents the embodiments identified as "RelEx+KBV_O'+KBV_train", the orange is identified as "RelEx+KBV_train", the gray is identified as "RelEx+ KBV_O" "and the yellow is identified as "RelEx". From the analysis of this data the precision or quality is at the highest utilizing the "RelEx+KBV_O"+KBV_train method for the recall of extracted triples (RET). For the entire spectrum of RET, from zero to 1, the embodiments indicate consistently high precision compared to the other methods. As one would expect, the lowest quality is when only RelEx is utilized. The second highest recall precision comes consistently from the gray data points "RelEx+KBV_O" that in some cases overlap the embodiments curve. Throughout the data curve, the orange data points are indicated somewhere in the middle of the embodiments and the least precise (RelEx) curve. It should be noted that this data is not isolated to the "Precision/Recall Curves for NYT-FB" data set, but the high precision result of the "RelEx+KBV_O"+KBV_train also applies in data sets using data from "Precision/Recall Curves for CC-DBP" and the data set from Precision/Recall Curves for NELL. In an estimated average for the three sets of data, if 0.5 is used as the barometer for recall of extracted triples, the accuracy results are as follows. As an average, the embodiments reflect an approximate 0.9 precision, the "RelEx+KBV_O" method reflects an approximate 0.85 precision, the "RelEx+KBV_train method reflects an approximate 0.8 precision and the RelEx reflects a 0.6 precision.

Figure 6:
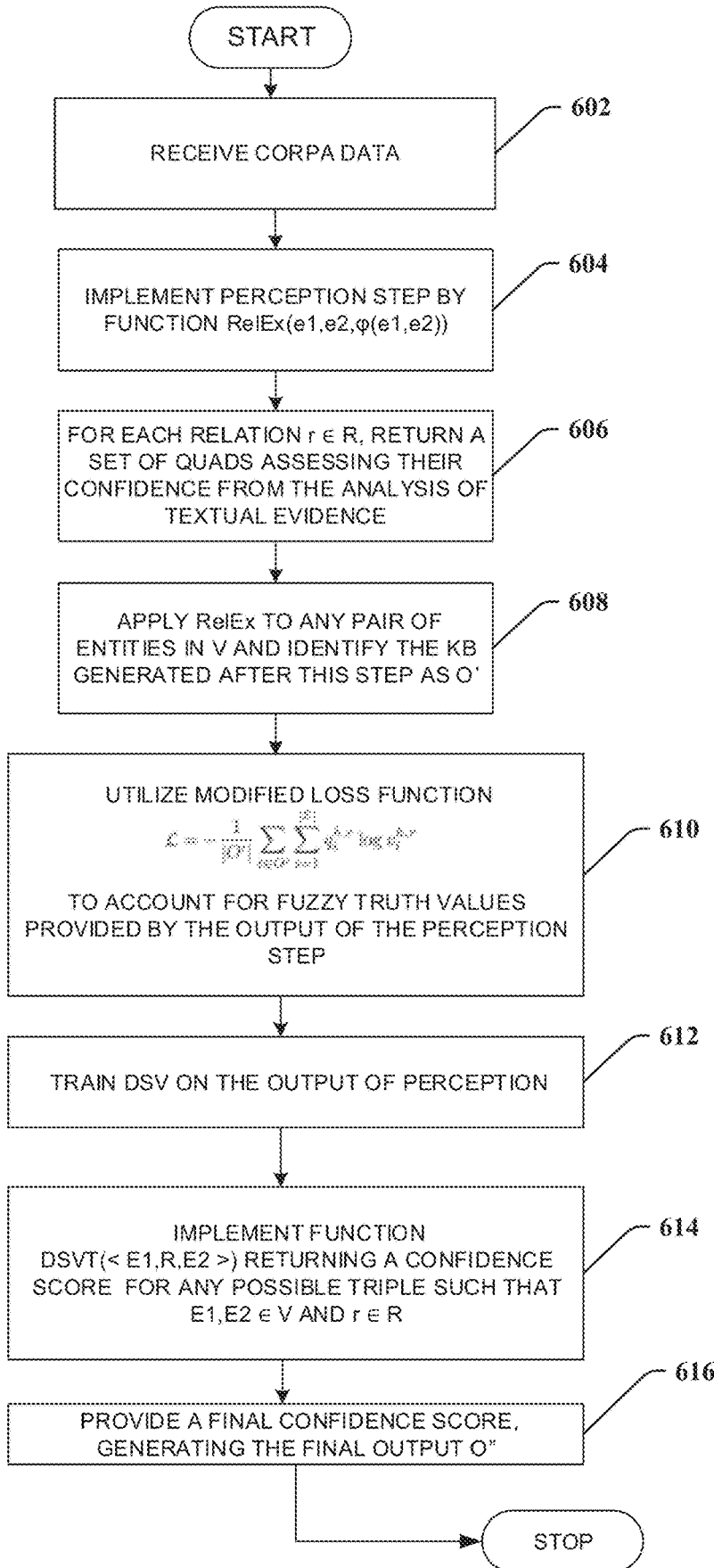
FIG. 6 illustrates a process flowchart for improving quality of knowledge graphs derived from output of extraction systems in accordance with one or more embodiments described herein.

FIG. 6 illustrates a process flowchart of the embodiments process of improving the quality of knowledge graphs derived from the output of extraction systems in accordance with one or more embodiments described herein. The initial step in the flow is to receive the corpus data as indicated in 602. The corpus is then subjected to relation extraction function (604) which will generate a set of quads (606) 0=q1, q2, ..., q'n from an corpus of text C=c1, c2, ..., cm. Quads have the form q=<e1, r, e2, s> where ei ∈ V are entities found in the corpus, r ∈ R is a finite set of relations and s ∈ [0,1]. For block 608, a knowledge base K consisting on quads q=<e1, r, e2, 1>∈ K is provided as an input and RelEx is trained from all their contexts φ(e1,e2) in a large corpus, subsequently after the system is trained, it is applied to all context sets for every pair of entities in the corpus C and generates an new set of quads O', where for each pair of entities e1 and e2 in |R| relations are generated and associated to their confidence score. For the embodiments to account for fuzzy truth values produced by the output of the perception step, the embodiments modify the loss function (610) into a new equation as shown below:

$$\mathcal{L} = -\frac{1}{|O'|} \sum_{i \in O'} \sum_{i=1}^{|\varepsilon|} q_i^{h,r} \log v_i^{h,r}$$

At block 612, output of the perception step is used for the DSV to train on. After training is done, this net can validate an input triple <e1,r,e2> and return an confidence score (614). Functionally, this net provides a function DSVT(<e1, r,e2>) returning a confidence score informed by the analysis of the knowledge graph T it has been trained from. The three confidence scores generated by applying RelEx, KBV'0 and KBVK to every triple in O' are then aggregated using a logistic regression layer trained on a validation set to provide a final confidence score, generating the final output O" (616)

Figure 7:
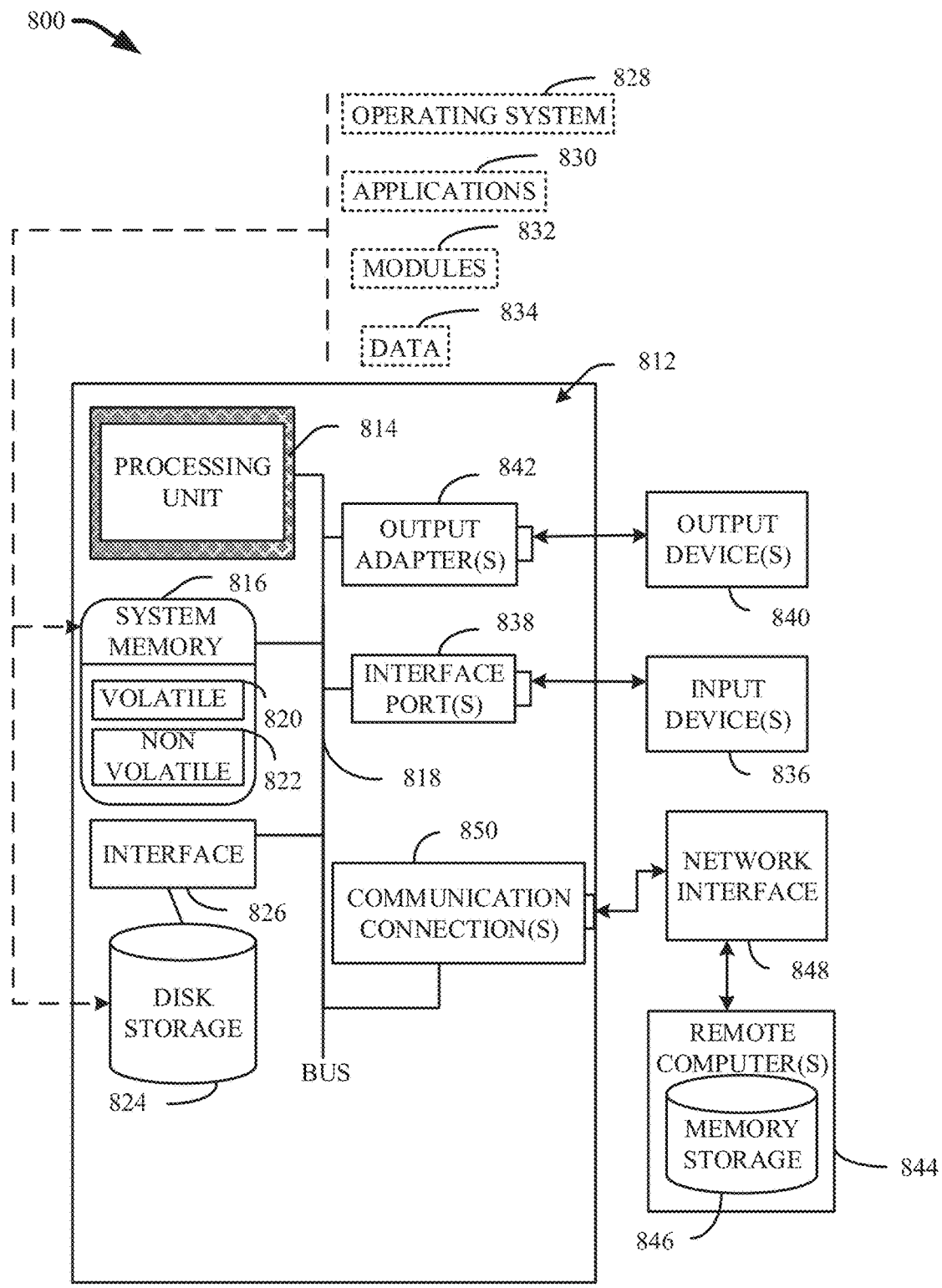
FIG. 7 is a schematic diagram of an example operating environment in accordance with one or more implementations described herein.

Turning to FIG. 7, a suitable operating environment 700 for implementing various aspects of this disclosure can also include a computer 712. The computer 712 can also include a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714. The system bus 718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1074), and Small Computer Systems Interface (SCSI). The system memory 716 can also include volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 720 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 712 can also include removable/non-removable, volatile/non-volatile computer storage media. FIG. 7 illustrates, for example, a disk storage 724. Disk storage 724 can also include, but is not limited to, devices like a magnetic disk drive, floppy disk drive, tape drive, Jaz drive, Zip drive, LS-100 drive, flash memory card, or memory stick. The disk storage 724 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 724 to the system bus 718, a removable or non-removable interface is typically used, such as interface 726. FIG. 7 also depicts software that acts as an intermediary between users and the basic computer resources described in the suitable operating environment 700. Such software can also include, for example, an operating system 728. Operating system 728, which can be stored on disk storage 724, acts to control and allocate resources of the computer 712. System applications 730 take advantage of the management of resources by operating system 728 through program modules 732 and program data 734, e.g., stored either in system memory 716 or on disk storage 724. It is to be appreciated that this disclosure can be implemented with various operating systems or combinations of operating systems. A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port can be used to provide input to computer 712, and to output information from computer 712 to an output device 740. Output adapter 742 is provided to illustrate that there are some output devices 740 like monitors, speakers, and printers, among other output devices 740, which require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a computer, a server, a router, a network PC, a workstation, a microprocessor-based appliance, a peer device or other common network node and the like, and typically can also include many or all the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 750 refers to the hardware/software employed to connect the network interface 747 to the system bus 718. While communication connection 750 is shown for illustrative clarity inside computer 712, it can also be external to computer 712. The hardware/software for connection to the network interface 748 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in one or more computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that one or more blocks of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, one or more blocks in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that one or more block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement abstract data types. Moreover, those skilled in the art will appreciate that the inventive computer-implemented methods can be practiced with other computer system configurations, including single-processor or multiprocessor computer systems, minicomputing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer-executable components;
 a processor, operably coupled to the memory, that executes the computer-executable components stored in the memory, wherein the computer-executable components comprise:
   a training component that acquires global representations of entities and relation by training from output of a relation extraction component, wherein the relation extraction component generates a set of quads from a corpus of data, wherein the quads have form $q=<e1, r, e2; s>$ where $ei \in V$ are entities found in the corpus of data, $r \in R$ is a finite set of relations and $s \in [0, 1]$.

2. The system of claim 1, further comprising a perception component that implements function RelEx(e1; e2, θ(e1; e2)) for one or more relations of the set of relations r ∈ R.

3. The system of claim 2, wherein the perception component also returns a set of quads assessing their confidence from analysis of textual evidence.

4. The system of claim 3, wherein the textual evidence is: RelEx(e1, e2, θ(e1, e2))=<e1, ri, e, si > ri ∈R, where si is a confidence score for relation ri.

5. The system of claim 3, further comprising a validation component that returns a confidence score for any possible triple such that e1, e2 ∈V and r ∈R.

6. The system of claim 1, wherein a mathematical loss function is implemented to account for confidence associated with triples.

7. The system of claim 1, wherein the training is dependent upon noisy output of relation extraction.

8. The system of claim 1, wherein relation triples identify threats in cybersecurity.

9. The system of claim 3, wherein validation is implemented by using a deep net where a loss function is modified to account for fuzzy truth values provided by output of the perception component.

10. A computer-implemented method, comprising:
acquiring, by the processor, global representations of entities and relation by training from output of relation extraction, wherein the relation extraction component generates a set of quads from the corpus of data, wherein the quads have form q=<e1, r; e2; s > where ei ∈V are entities found in the corpus of data, r ∈R is a finite set of relations and s ∈[0, 1].

11. The computer-implemented method of claim 10, further comprising performing a perception act that implements function RelEx(e1; e2, θ(e1; e2)) for one or more relations of the set of relations r ∈R.

12. The computer-implemented method of claim 11, further comprising returning a set of quads assessing their confidence from analysis of textual evidence.

13. The computer-implemented method of claim 12, wherein the textual evidence is: RelEx(e1, e2, θ(e1, e2)) =<e1, ri, e, si >ri ∈R, where si is a confidence score for relation ri.

14. The method of claim 13, further comprising performing a validation act that returns a confidence score for any possible triple such that e1, e2 ∈V and r ∈R.

15. The method of claim 10, wherein relation triples identify threats in cybersecurity.

16. A non-transitory computer program product, comprising a computer readable storage medium having program instructions embodied therewith, the program instructions executable by a processor to cause the processor to:
acquire, by a processor, global representations of entities and relation by training from output of the relation extraction, wherein the relation extraction component generates a set of quads from the corpus of data, wherein the quads have form q=<e1, r; e2; s > where ei ∈V are entities found in the corpus of data, r ∈R is a finite set of relations and s ∈[0, 1].

17. The non-transitory computer program product of claim 16, wherein the program instructions are executable by the processor to also implement function RelEx(e1; e2, θ(e1; e2)) for one or more relations of the set of relations r ∈R.

18. The non-transitory computer program product of claim 17, wherein program instructions are also executable by the processor to return a set of quads assessing their confidence from analysis of textual evidence.

19. The non-transitory computer program product of claim 18, wherein the textual evidence is: RelEx(e1, e2, θ(e1, e2))=<e1, ri, e, si >ri ∈R, where si is a confidence score for relation ri.

20. The non-transitory computer program product of claim 18, wherein the program instructions are also executable by the processor to return a confidence score for any possible triple such that e1, e2 ∈V and r ∈R.

* * * * *